United States Patent [19]
Snyder

[11] 3,837,530
[45] Sept. 24, 1974

[54] SHANK SUPPLY FOR BUTTON-SEWING ATTACHMENTS

[75] Inventor: Benjamin L. Snyder, Hillside, N.J.

[73] Assignee: Pentapco, Inc., Elizabeth, N.J.

[22] Filed: Apr. 26, 1973

[21] Appl. No.: 354,824

Related U.S. Application Data

[63] Continuation-in-part of Ser. No. 251,824, May 9, 1972.

[52] U.S. Cl............... 221/268, 221/271, 221/276, 112/113
[51] Int. Cl............................................. B65h 5/16
[58] Field of Search...... 221/268, 271, 276; 269/37, 269/45; 112/113, 108, 104

[56] References Cited
UNITED STATES PATENTS

| | | | |
|---|---|---|---|
| 1,302,280 | 4/1919 | Batchelder | 269/37 X |
| 1,435,743 | 11/1922 | Salfisberg | 221/241 X |
| 1,892,581 | 12/1932 | Levine | 112/113 UX |
| 3,109,557 | 11/1963 | Klancnick | 221/271 X |

Primary Examiner—Robert B. Reeves
Assistant Examiner—Joseph J. Rolla
Attorney, Agent, or Firm—Blum Moscovitz Friedman & Kaplan

[57] ABSTRACT

A shank supply for a button-sewing attachment. The shank supply has a positioning portion for positioning a shank properly with respect to a button, and a feed is provided for feeding a shank to the positioning portion to the held thereby at a proper position with the feed retaining the shank at the location determined by the positioning portion in such a way that the shank is freely rotatable. A guide is provided for guiding a series of shanks in succession to the feed which functions to successively deliver the shanks individually to the positioning portion.

13 Claims, 16 Drawing Figures

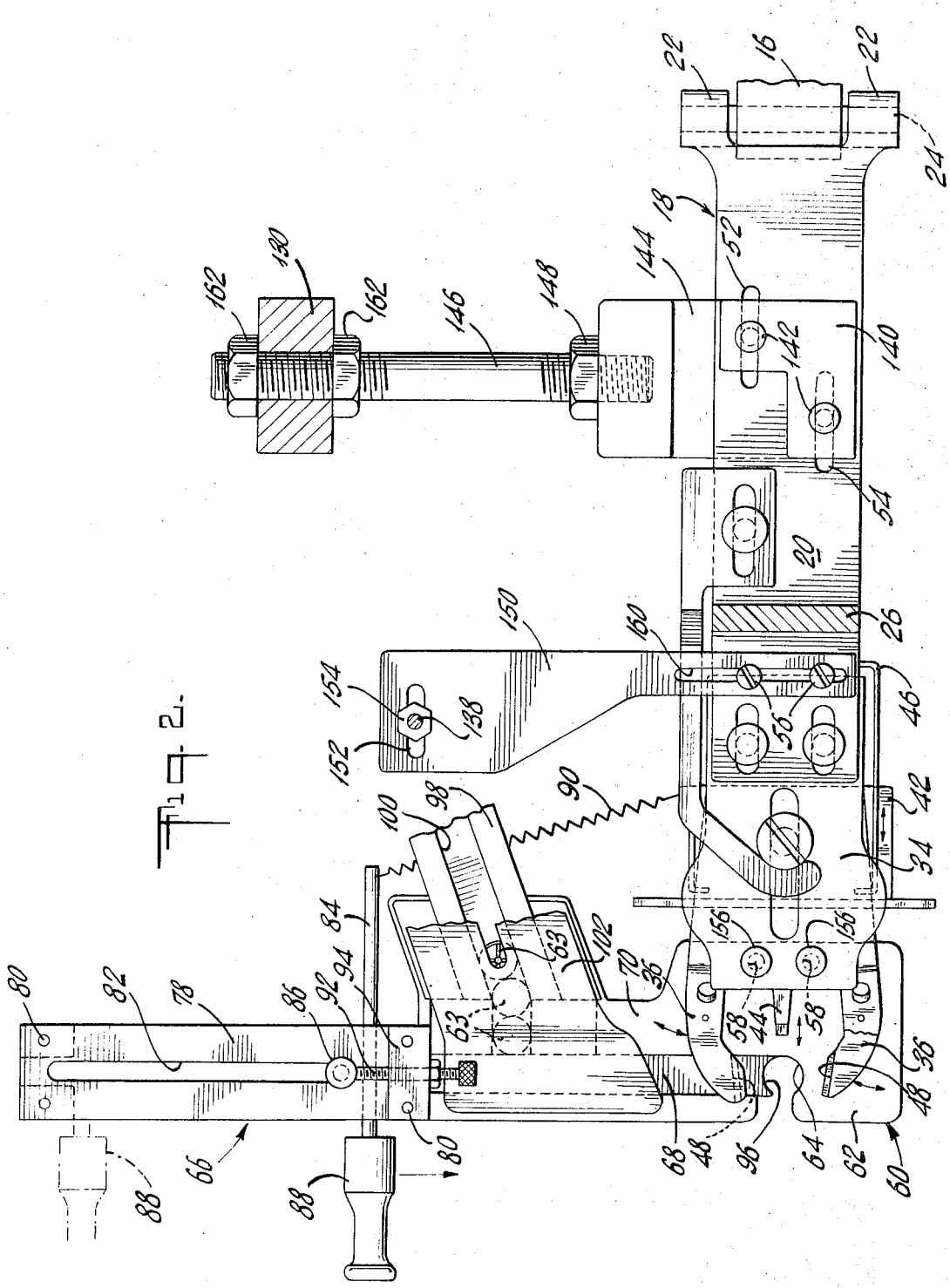

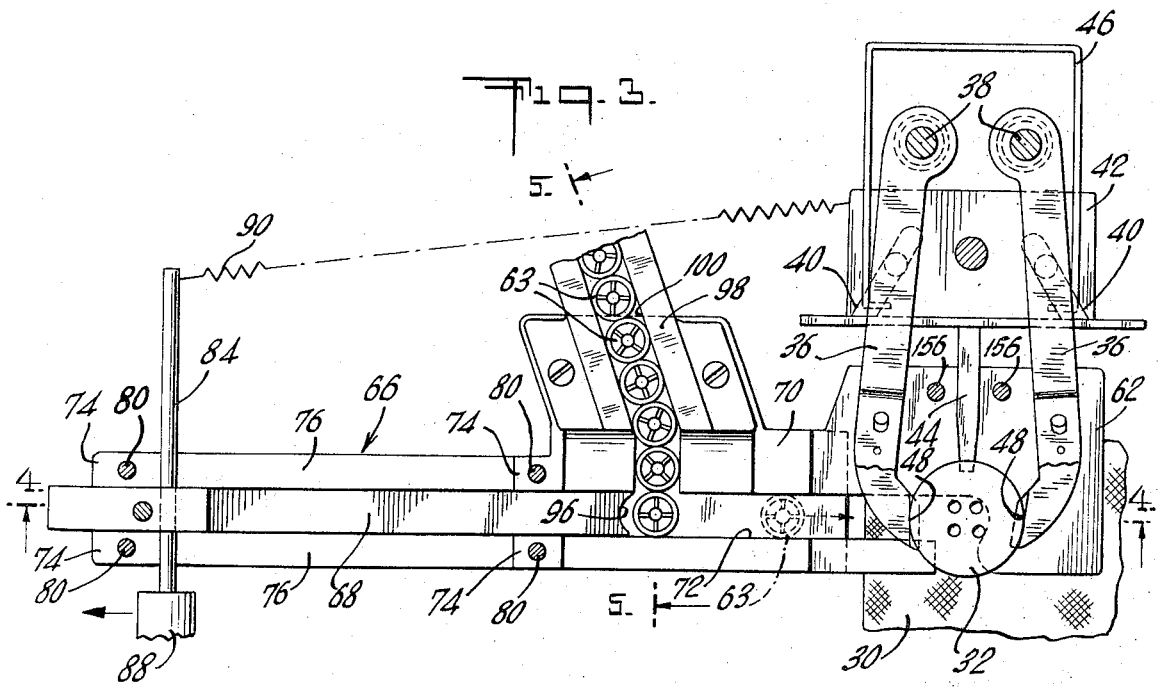
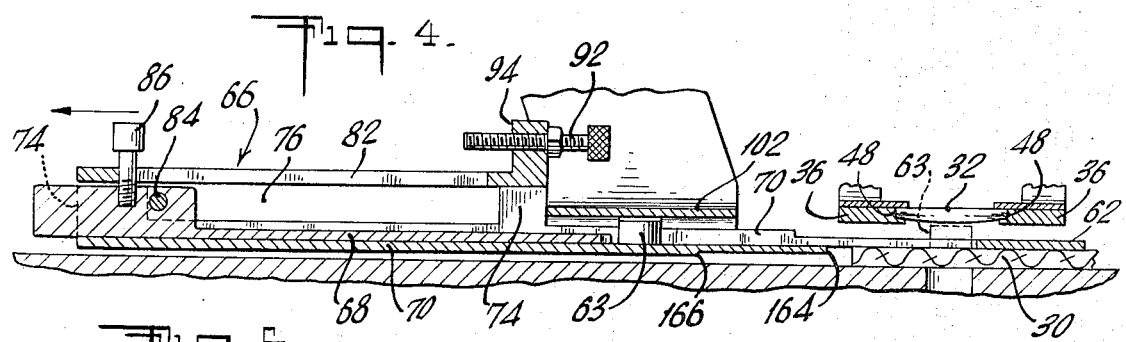
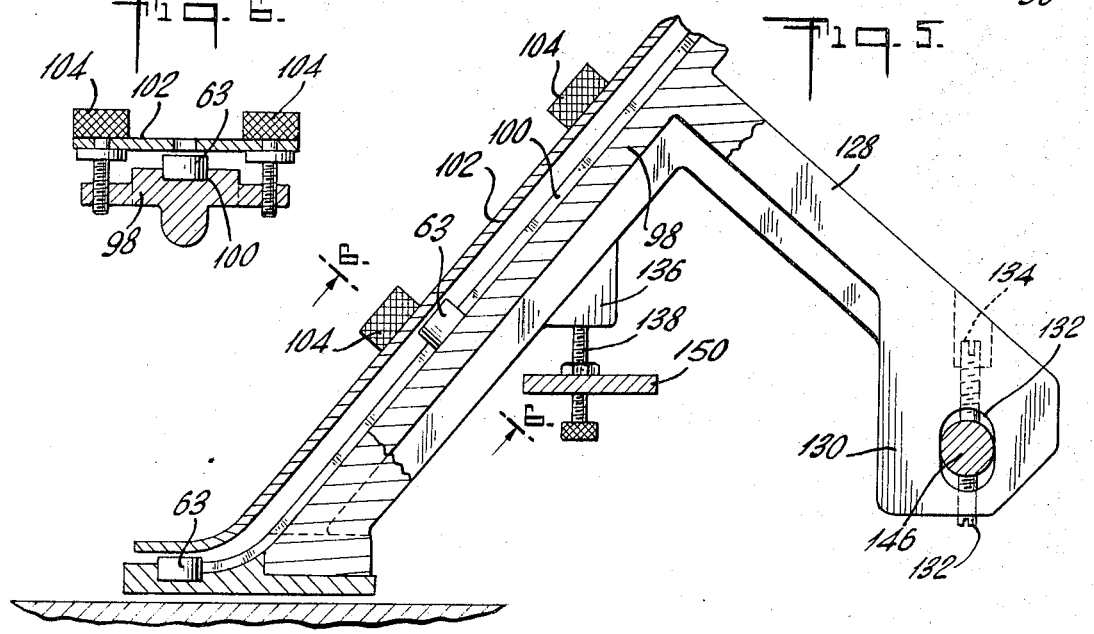

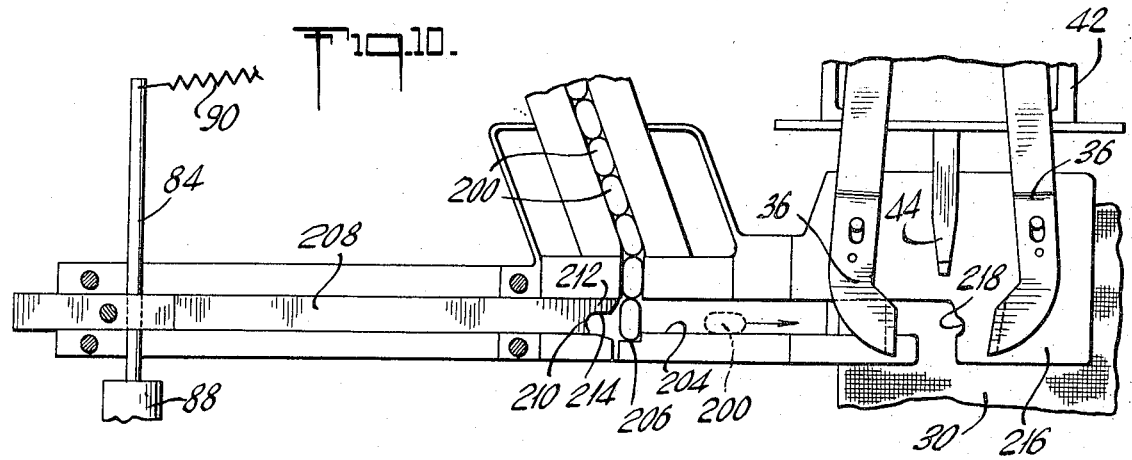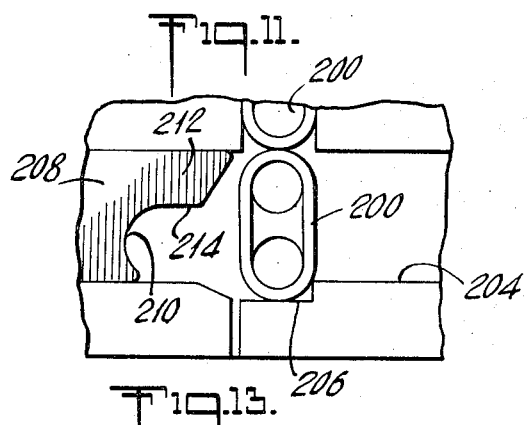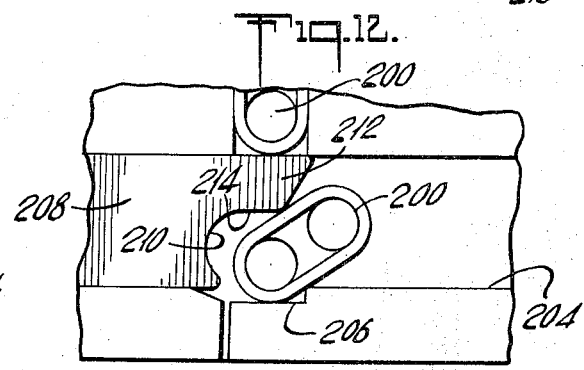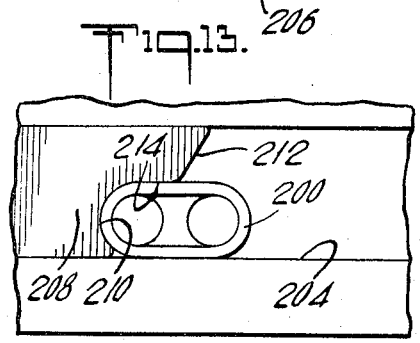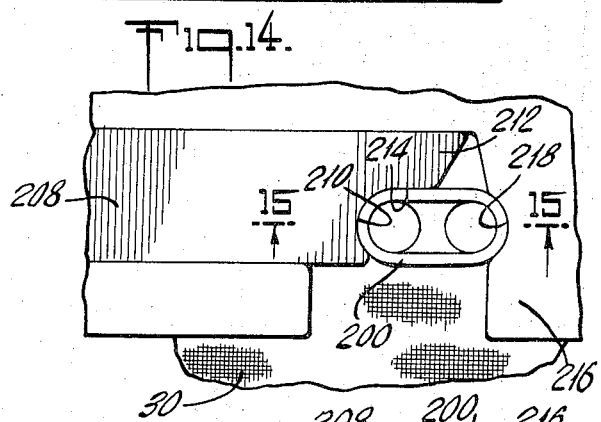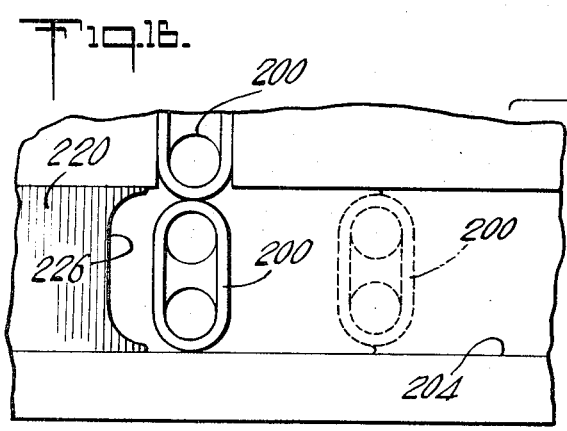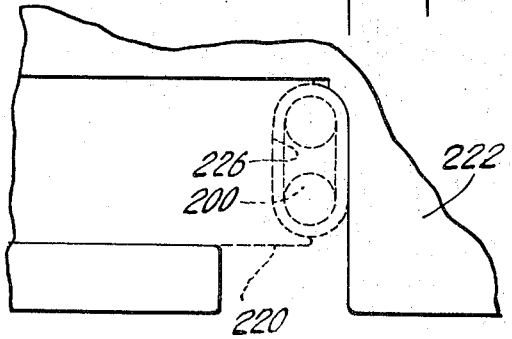

SHANK SUPPLY FOR BUTTON-SEWING ATTACHMENTS

CROSS-REFERENCE TO RELATED APPLICATION

This application is a continuation-in-part of application Ser. No. 251,824 filed May 9, 1972, for "Shank Supply For Button-Sewing Attachment."

BACKGROUND OF THE INVENTION

The present invention relates to the sewing of buttons onto garments.

There are at the present time known button-sewing attachments which are used with sewing machines for facilitating the sewing of buttons to garments. While such button-sewing attachments have holders to hold the button in a position to be sewn onto the garment, it is customary to situate between the button and the garment a shank for improving the connection of the button to the garment, and at the present time such shanks must be manually positioned. For example when a garment is to be provided with buttons, the fabric of the garment is provided with suitable indicating dots which show where the buttons are to be located, and the operator will manually position a shank at a dot prior to sewing of a button onto the garment. In this connection reference may be had to U.S. Pat. No. 3,390,434 which shows shanks of the type referred to above and which describes the manner in which they are used.

A further requirement made on the operator is that the shank be properly oriented angularly so that the needle will pass downwardly through passages which are formed in the shank. Therefore, when performing the manual operations referred to above, the operator must first locate a shank on the dot, for example, and then must make certain that the shank is properly oriented angularly to permit passage of the needle through the shank.

These manual operations greatly increase the costs involved in the manufacture of garments, and these costs are further increased by the fact that the shanks are normally extremely small elements which can be properly held in position only with the exercise of extreme care by the operator.

SUMMARY OF THE INVENTION

It is accordingly a primary object of the present invention to provide a shank supply which will enable manual operations of the above type to be eliminated.

In particular, it is an object of the present invention to provide a shank supply attachment capable of being attached to conventional button-sewing attachments for delivering shanks thereto in such a way that the shanks are automatically positioned properly with respect to the buttons.

A further object of the present invention is to provide a structure of the above type which is capable of holding a shank properly positioned in such a way that the shank, if circular, is free to rotate so that it will automatically orient itself with respect to a needle.

Yet another object of the present invention is to provide a construction of the above type which enables the shank-supply attachment of the invention to be used with shanks of different shapes, with various button-sewing attachments of different constructions, and with sewing machines of different constructions.

Furthermore, it is an object of the present invention to provide a shank-supply attachment which enables the shank to be held in elevation in such a way that while it clears a button nevertheless it is so close thereto that a tight secure connection of the button to the garment with the shank therebetween is assured.

According to the invention the shank-supply attachment has a positioning means for properly positioning a shank with respect to a button. A feed means is provided for feeding a shank to the positioning means to be positioned thereby with this feed means retaining a shank in the position determined by the positioning means. A guide means is provided for guiding shanks to the feed means to be individually fed thereby to the positioning means.

According to the method of the invention the shank is positioned so close to the button that while it clears the button nevertheless it will provide a secure connection between the button and the garment. Moreover, with the method of the invention the shank is positioned in such a way that it is free to rotate so that it is capable of automatically orienting itself with respect to a needle.

BRIEF DESCRIPTION OF DRAWINGS

The invention is illustrated by way of example in the accompanying drawings which form part of this application and in which:

FIG. 2 is a partly sectional plan view taken along line 2—2 of FIG 1 in the direction of the arrows;

FIG. 3 is a partly sectional plan view taken along line 3—3 of FIG. 1 in the direction of the arrows;

FIG. 4 is a transverse sectional elevation taken along line 4—4 of FIG. 3 in the direction of the arrows;

FIG. 5 is a longitudinal sectional elevation taken along line 5—5 of FIG. 3 in the direction of the arrows;

FIG. 6 is a transverse sectional elevation taken along line 6—6 of FIG. 5 in the direction of the arrows;

FIG. 10 is a fragmentary plan view of another embodiment of the invention for operating with elongated, substantially elliptical shanks;

FIG. 11 is a fragmentary top plan view showing that part of the structure of FIG. 10 where the shank reaches a feed bar at an enlarged scale as compared to FIG. 10;

FIG. 12 shows the parts of FIG. 11 in the position they assume immediately subsequent to the position thereof shown in FIG. 11;

FIG. 13 shows the components of FIG. 12 in the position they assume subsequent to the position thereof shown in FIG. 12;

FIG. 14 shows the parts in a position subsequent to that of FIG. 13 with a shank in its final position;

FIG. 15 is a fragmentary longitudinal sectional elevation taken along line 15—15 of FIG 14 in the direction of the arrows and showing how the shank is positioned during sewing of a button; and FIG. 16 is a fragmentary plan view showing how a feed means of a different configuration will cooperate with shanks of the type shown in FIGS. 10–14 in order to displace these shanks without turning them.

DESCRIPTION OF PREFERRED EMBODIMENTS

Figure 1:
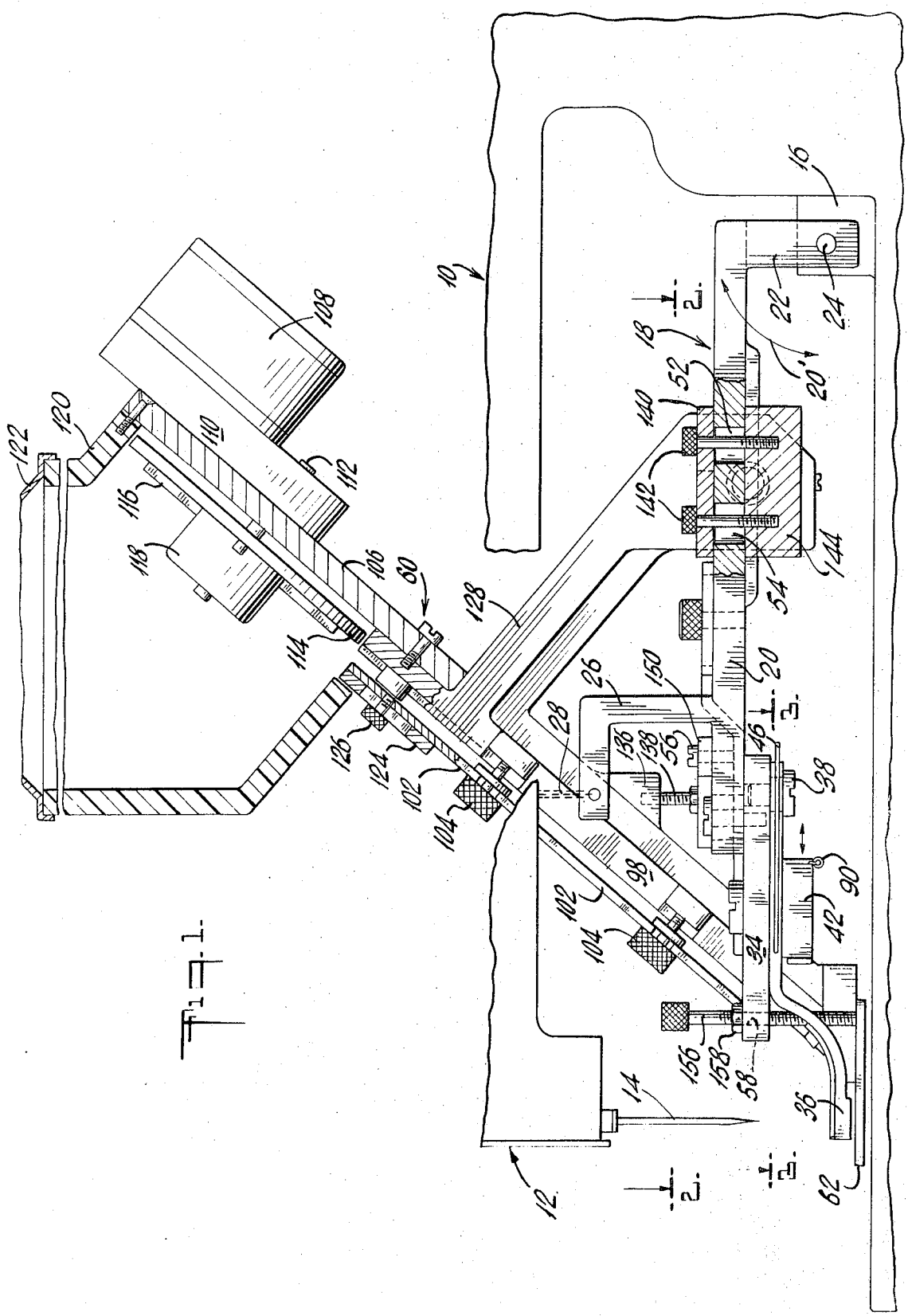
FIG 1 is a partly sectional side elevation of a shank-supply attachment according to the invention shown in FIG 1 connected to a button-sewing attachment which is shown with a fragmentarily illustrated sewing machine.

Referring first to FIG. 1, there is fragmentarily illustrated therein a sewing machine 10 provided with the sewing head 12 from which the needle 14 projects to carry out the sewing operations in a well known manner. The sewing machine 10 has a suitable mounting bracket 16, shown at the lower right of FIG. 1, on which a button-sewing attachment 18 is pivotally supported for swinging movement as illustrated by the arrow 20'. Thi button-sewing attachment 18 is conventional and includes an elongated bar 20 having at its right end, as viewed in FIG. 1, a depending portion 22 which is pivotally connected to the bracket 16 by a pin 24, so that swinging movement of the button-sewing attachment 18 between the position shown in FIG. 1 and that shown in FIG. 7 can be carried out in a well known manner. For this purpose the bar 20 carries at its upper surface an upwardly projecting extension 26 connected, as by a chain 28 to mechanism of the sewing machine which brings about the swinging of the attachment 18 in a well known manner. When the attachment 18 is in the raised position shown in FIG. 7, the fabric of the garment 30 is properly positioned, a button 32 is introduced into the attachment, and then the attachment 18 is lowered to the position shown in FIG. 1 so that the sewing operations will go forward.

The bar 20 is fixed to a front bar portion 34 to which button-holding clamps 36 are swingably connected as by pivot screws 38. The clamps 36 respectively have projections received in inclined grooves 40 (FIG. 3) of a shiftable member 42 which thus enables the angular position of the clamps to be adjusted in accordance with the diameter of the button 32. Also, the conventional attachment 18 includes a positioning finger 44 formed with a shoulder to engage part of the periphery of the button 32. A wire spring 46 engages the clamps 36 for urging them toward each other. As is shown most clearly in FIG. 8, the clamps 36 terminate in shoulders or recesses 48 which receive the periphery of the button 32 so that the latter will be held by the button-sewing attachment 18.

The plate 34 of the attachment 18 is adjusted and fixed to the bar 20 in such a way that when a button 32 is held by the clamps 36 and positioned longitudinally by the finger 44, the needle 14 will pass through the buttonholes and into the fabric of the garment 30 for sewing the button thereto.

The above conventional structure is modified slightly so as to adapt it to be connected with the shank-supply attachment of the present invention.

Thus, the bar 20 is formed with a pair of elongated longitudinally extending slots 52 and 54 arranged as illustrated in FIGS. 1 and 2. In addition the bar 20 is formed with threaded bores for receiving a pair of screws 56 for a purpose referred to below. Finally, the front plate 34 is formed with a pair of threaded openings 58 also for a purpose referred to below. These are the only modifications required in the conventional button-sewing attachment, and with these modifications it is possible to connect a shank-supply attachment of the invention to different types of button-sewing attachments not only to adapt the shank-supply attachment for use with these different types of button-sewing attachments but also to adapt the shank-supply attachments to be used with different types of sewing machines.

Figure 8:
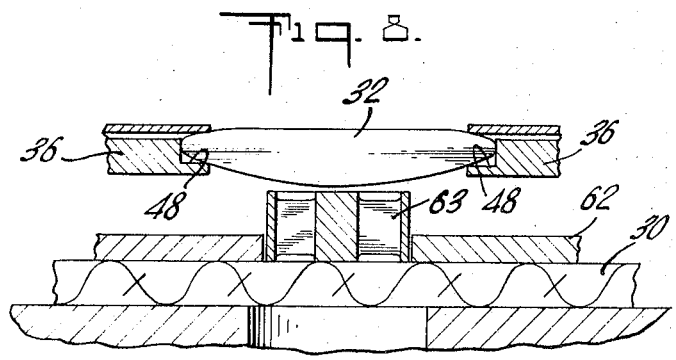
FIG. 8 is a fragmentary transverse section showing a shank held by the structure of the invention between a button and a garment.
Figure 9:
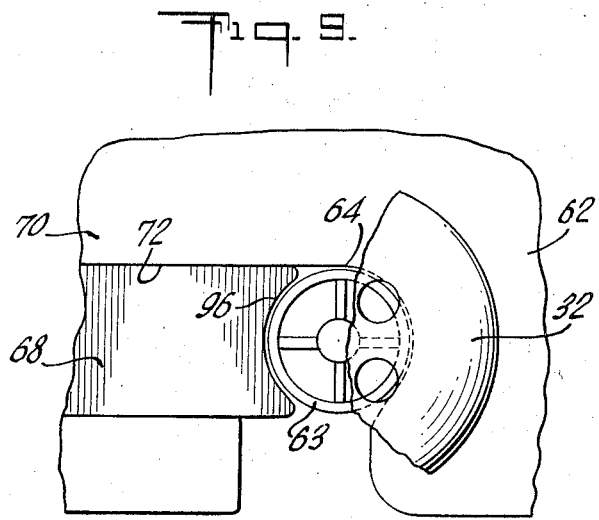
FIG. 9 is a fragementary plan view illustrating further how a shank is positioned beneath a button and held by the attachment of the invention.

The shank-supply attachment 60 of the invention includes a positioning means 62 for positioning a shank 63 in the manner shown most clearly in FIG. 8. Referring to FIG. 9 it will be seen that the plate which forms the positioning means 62 is formed with an arcuate edge 64 which extends part of the way around the shank 63 so as to determine the position thereof beneath the button 32.

This positioning means 62 extends horizontally beyond the button-sewing attachment and forms a support means 70 in the form of a plate which is an integral extension of the plate 62, and this support means formed by the plate 70 supports a feed means 66 which serves to feed the shanks 63 one after the other to the location shown in FIGS. 8 and 9. The feed means 66 includes an elongated feed bar 68. The plate or support means 70 is formed with an elongated channel 72 in which the bar 68 is guided for longitudinal movement. This plate or support means 70 has upstanding flanges 74 extending longitudinally along the opposed side edges of the plate 72, and these flanges 74 are formed with elongated notches or cutouts 76 which extend longitudinally along each flange 74 in the manner shown most clearly in FIG. 4. The space between the flanges 74 is covered by a plate 78 fixed in any suitable way to the top surfaces of the flanges 74, as by the four screws 80 indicated in FIG. 2. The plate 78 is formed with a longitudinal slot 82 aligned with the channel 72 as well as with the space between the flanges 74. The elongated feed bar 68 has at its left end, as viewed in FIG 4, a thicker portion through which a transverse rod 84 extends, and this rod 84 also extends through the notches 76 beneath the plate 78. This portion of the bar 68 which carries the rod 84 also carries a screw 86 which extends through the slot 82 so as to limit the movement of the feed bar 68 to the left, as shown in FIG. 4.

The rod 84 carries at one end a handle 88 accessible to the operator, and the opposite end of the rod 84 is connected with one end of an elongated spring means 90, the opposite end of which is fixed to any part of the attachment 18, for example, so that this spring means 90 yieldably urges the feed means 66 to the right, to the position illustrated in FIG. 2. The location of the bar 68 in this latter position is determined by an adjusting screw 92 adjustably carried by an upstanding portion 94 of the plate 78, as shown in FIG 4. Thus, the free end of the adjustable stop screw 92 will engage the screw 86 to limit the movement of the bar 68 to the right, as viewed in FIG. 4, and in this way the feed means 68 acts to feed a shank 63 to the positioning means 62.

It will be noted that the free end of the bar 68 also has an arcuate edge 96. When the bar 68 is held in its retaining position where the screw 86 engages the stop member 92, as shown in FIGS. 2 and 9, the arcuate edges 64 and 96 extend around the shank 63 so that the latter is securely retained in its position determined by the positioning means 62 by the free end of the feed bar 68. However, the position of the stop screw 92 is such that the shank 63 is not tightly gripped between the feed bar 68 and the positioning means 62. Instead these components extend at their arcuate edges around the shank 63 with a clearance sufficient to free the shank 63 for rotary movement. It will be noted that the shank 63 has a rotary movement. It will be noted that the shank 63 has a central core and transverse ribs extending between the central core and the outer cylindrical portion of the shank 63. Thus, with this arrangement if the needle should by chance engage any of the transverse radial ribs of the shank extending between its core and outer cylinder, the shank will automatically respond to turn, in order to align a space between the radial ribs with the needle 14 so that the latter will automatically pass down through a space between a pair of ribs. In this way the structure of the invention while retaining a shank in its position nevertheless permits the shank to rotate freely in order to achieve an automatic angular orientation with respect to a needle 14.

A guide means 98 is provided for guiding the shanks 63 to the feed means 66. This guide means 98 takes the form of an elongated channel formed in its upper surface with an elongated shank-guiding groove 100. The lower discharge end of the groove 100 communicates with the channel 72, as shown most clearly in FIG. 3. Thus, when the handle 88 is actuated to retract the feed bar 68 in opposition to the spring 90 to the position shown in FIG. 3, the next shank will slide automatically into the channel 72 to be situated in front of the bar 68 which then may be released so that the spring 90 will contract and displace a shank as shown in dot-dash lines in FIG. 3, to the position indicated in FIGS. 8 and 9.

The elongated guide means 98 is fixed directly to the support means or plate 70 and forms a unitary body therewith. The channel 100 is covered by a plate 102 which is held over the channel of the guide means 98 by screws 104 which are capable of being adjusted in elevation, as shown most clearly in FIG. 6, so that the elevation of the plate 102 with respect to the channel 100 will adapt the structure to shanks 63 of various depths.

As is shown most clearly in FIG. 1, the elongated guide means 98, which is inclined downwardly so that the shanks slide downwardly by gravity, is fixed at its upper end to a plate 106 which carries a driving motor 108 connected with any suitable source of electricity and serving through a gear transmission 110 to rotate a shaft 112 which is fixed to a rotary plate 114 carrying at its upper surface ribs 116. The plate 114 has a central projection 118. The rotary plate 114 is housed within a hopper housing 120 fixed to the plate 106, which in turn is fixed to the guide means 98 as shown in FIG. 1. This hopper housing 120 has a removable cover 122. When the cover is removed the operator can introduce a large number of shanks into the housing 120. When the motor 108 operates the rotary plate 114 together with its ribs 116 continuously stir and maintain the shanks in motion so that they fall one after the other into the elongated channel 100 to slide down the latter, by gravity so as to reach in this way the feed bar 68 in the manner shown most clearly in FIG. 3. In order to close the gap between the front end of the housing 120 and the plate 102, the latter carries an adjustable closure plate 124 capable of being adjusted by a screw 126.

Thus, as is apparent from the above description, the supply attachment of the invention includes the unitary body formed by the guide means 98 and the support means 70, the latter having as a free extension the positioning means 62, and this support means 70 serves to support the feed means 66 for movement in the manner described above.

In order to be able to attach this structure to the button-sewing attachment 18, the guide means 98 has an integral extension 128 extending downwardly toward the right, as viewed in FIG. 1, and being perpendicular with respect to the elongated guide means 98. This extension 128 terminates at its lower end in the portion 130 which is shown most clearly in FIG. 5. This portion 130 is formed with an elongated opening 132 passing therethrough in the manner shown also in FIG. 5. In addition, the portion 130 is formed with threaded bores to receive a pair of set screws 133 and 134, for a purpose referred to below, and the portion 130 is formed with a suitable bore in which the top of the set screw 134 is accessible, as shown in FIG. 5.

Furthermore, as shown in FIGS. 1 and 5, the guide means 98 is provided with an integral projection 136 which is formed with a threaded bore to receive a screw 138 for a purpose referred to below.

A fixing means is provided for fixing the attachment of the invention to the button-sewing attachment. This fixing means includes the L-shaped bracket 140 which is shown most clearly in FIG. 2. This bracket 140 rests on the top surface of the bar 20 and has openings aligned with the slots 52 and 54 so that fixing screws 142 can pass through these slots after passing through openings in the bracket 140. The lower threaded ends of the screws 142 are received in a robust block 144 which is fixed by the screws 142 against the lower surface of the bar 20. This block 144 extends laterally beyond the bar 20 and has a portion formed with a threaded bore to receive an end of a mounting screw 146 which is in the form of a threaded stud one end of which is received in a threaded bore of the block 144. The stud 146 carries a lock nut 148 for fixing it in position in the block 144.

Distant from the block 144 the threaded stud 146 extends through the elongated opening 132 shown at the lower right of FIG. 5. The set screws 132 and 134 engage upper and lower surfaces of the screw 146.

In addition, the structure of the invention includes a mounting plate 150 which receives the screws 56 which extend into the threaded bores of the bar 20, as pointed out above. This mounting plate 150 is formed distant from the bar 20 with a longitudinally extending slot 152. The slot 152 receives the threaded screw or stud 138 which extends into the projection 136 of the guide means 98. The stud 138 is fixed in position with respect to the mounting plate 150 by a pair of lock nuts 154.

As was pointed out above, the bar 20 is formed at its front end with the openings 58. These openings 58 receive a pair of adjusting screws 156 which are maintained at an adjusted elevation by lock screws 158. Thus, the openings 58 are threaded, the screws 156 are threaded therethrough and the lock nuts 158 fix the screws 156 in position.

When the attachment 60 of the invention is to be connected with the attachment 18, the screws 142 are extended through the bracket 140 into threaded openings of the block 144. The stud 146 is then extended through the opening 132. This structure serves to fix the rear portion of the attachment of the invention to the above sewing attachment. The central portion is fixed by way of the plate 150. Thus, the screws 56 are extended through the slot 160 shown in the plate 150 in FIG. 2, these screws 56 being received in threaded bores of the bar 20. The screw 138 extends through the slot 152 into the threaded bore of the projection 136.

By shifting the screws 142 along the slots 52 and 54, it is possible to determine the longitudinal position of the attachment 60 of the invention, in a direction parallel to the length of the bar 20. Once this position is determined the screws 142 may be tightened.

The set screws 132 and 134 are loosened during the elevational adjustment, and after such adjustment is completed, these set screws are tightened against the stud 146 so that the rear portion of the attachment also has its elevation adjusted at the stud 146.

Thereafter the entire attachment is shifted along the stud 146. In this way it is possible to adjust the attachment 60 transversely. These adjustments of course are carried out so as to precisely locate the positioning means 62 so that a shank will be properly positioned beneath a button. Once this lateral adjustment is completed the lock nuts 162 on the stud 146 may be tightened to retain the attachment in its laterally adjusted position. Once this elevational adjustment is completed the nuts 154 are tightened. With the nuts 154 tightened and with the nuts 142 and 162 tightened, the attachment of the invention is properly positioned with respect to the button-sewing attachment 18 both longitudinally and transversely thereof as well as in elevation. In order to aid in maintaining the foregoing adjusted position, the central portion is fixed by locking plate 150 in position by tightening screws 56 and nut 154.

Referring to FIG. 4, it will be seen that the underside of the plate 70 is formed at its right end with an undercut 164 which is followed by a second undercut 166. The undercut 164 is provided so that the fabric of the garment 30 can be properly positioned beneath the positioning means 62 in a position permitting the fabric to be flattened out while extending across the space to receive the shank, just beneath this shank in a flat condition. The undercut 166 serves similarly to enable the plate 70 to be located close to the base of the sewing machine while still accommodating the fabric 30. In this way the fabric will be smoothed out with its top surface situated in a plane which will serve to properly support the shank beneath the button. The elevational adjustment carried out by the screw 138 is such that when the shank is on the fabric the top surface of the shank will clear the lower surface of the button.

However, in order to make this latter adjustment in the most precise manner, the screws 156 are threaded so as to press at the bottom ends against the top surface of the positioning means 62. In this way it is also possible to adjust the elevation of the top surface of the fabric so that the shank will be very precisely located with respect to the button.

These adjustments carried out particularly by the screws 156, which are maintained in their adjusted positions by the nuts 158, are designed so that there will be between the top surface of each shank and the button thereover a clearance on the order of 0.003 inch. It has been found that this small clearance while sufficient to provide for free movement of each shank to the location beneath the button, without contacting the latter is nevertheless small enough to assure a secure connection with the thread tightly holding the button to the garment and with the shank compressed between the garment and the button after the sewing operations are completed.

Figure 7:
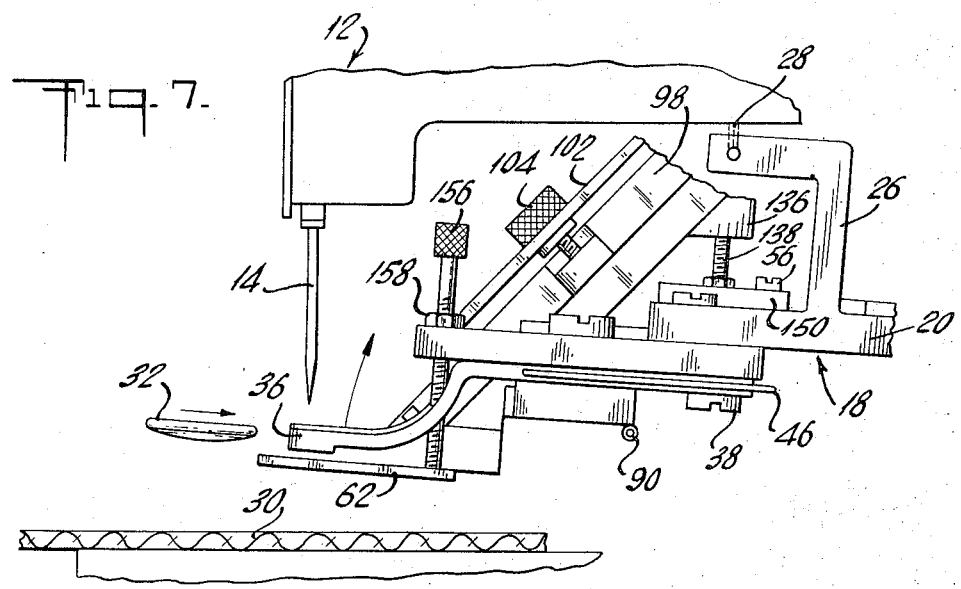
FIG. 7 is a schematic illustration of the operation of the structure of the invention.

Thus, with the structure of the invention the shank-supply attachment 60 is fixed to the button-sewing attachment 18 so as to swing therewith between the positions shown in FIGS. 1 and 7. In the position of FIG. 7 the operator will place a button in th button-sewing attachment in the manner described above. When the structure swings down, it is in a position to receive a shank, and for this purpose the operator will shift the handle 88 to the left, as shown by the arrow at the lower left of FIG. 3. This will automatically locate a shank in front of the bar 68 which, when the operator releases the handle 88, is pulled back by the spring 90 to the position where the shank will be located as shown in FIGS. 8 and 9. In this position the shank is free to rotate as pointed out above while at the same time having extremely small clearance beneath the button 32 and being pricisely positioned.

Of course, instead of providing a handle 88 for manual movement of the feed means, it is possible for the latter to be automatically moved from any suitable source of power such as from a suitable hydraulic system.

While in connection with the above description reference has been made to circular shanks as shown in FIGS. 3 and 9, the invention is also useful in connection with shanks of other configurations such as the elongated substantially elliptical configuration shown in FIGS. 10–14 and 16.

The embodiment of FIGS. 10–14 is identical with that described above except for the differences noted below. With the embodiment of FIGS. 10–14 the structure is capable of handling the elongated substantially elliptical shanks 200. A supply of these shanks is situated in a housing or hopper 120 which may be identical with that shown in FIG. 1 and in which the shanks are stirred in precisely the same way. Thus the shanks 200 will be delivered one after the other to an elongated narrow groove formed in the downwardly directed guide means 202 which is identical with the guide means 98 except that the guide means 202 has a narrower groove for receiving the shanks 200 in the manner shown in FIG. 10 according to which they are aligned one after the other in a row in end-to-end relation as illustrated in FIG. 10.

In this way the shanks will slide down the guide means 202 into the horizontally extending channel 204 which corresponds to the channel 72. However, it will be noted that the channel 204 is provided at its left end distant from the guide means 202 with a shoulder 206.

It will be noted that with the embodiment of FIGS. 10–14, the feed bar 208 which corresponds to the feed bar 68 and operates in the same way, is formed with a substantially semicircular curved end edge portion 210 and beyond the latter with an extension 212. The extension 212 has an edge 214 which extends longitudinally of the feed bar 208 at a distance from the edge of channel 204 which is distant from the guide means 202 which is equal to the diameter of the semicircular edge 210, this diameter being equal to the width of the shank 200. Thus, the shank 200 has opposed ends of semicircular configuration each of which conforms to the configuration of the edge 210.

With this construction when the operator releases the feed bar 208 to the force of the spring 90, the feed bar 208 will be advanced to the right, from the position shown in FIG. 10 toward the position shown in FIG. 14. During this movement of the feed bar 208 the extension 212 thereof will engage that end of the shank 200 which is distant from the shoulder 206 and will tilt the shank 200 around the step formed by the shoulder 206 in the manner shown in FIG. 14, so that the shank 200 will become longitudinally oriented in the manner shown in FIG. 13 to be carried along with the feed bar 208 from the position of FIG. 13 to the position of FIG. 14. As may be seen from FIG. 14, the part 216 which corresponds to the part 62 is formed with a curved edge portion 218 for receiving the leading end of the shank 200 in the manner shown in FIG. 14. It is to be emphasized that the parts are shown in the drawings at a greatly enlarged scale. In an actual example the radius of the curved edge 218 is on the order of 0.060 inch. Also in this case the screw 92 may be adjusted so that it will engage the screw 86 in such a way that the pressure of the feed bar 208 on the shank 200 when it is in the position of FIG. 14 will not be excessive. It is to be noted that with the arrangement shown in FIG. 14 it is possible, after the button is sewn to the garment, to displace the right end of the shank 200 of FIG. 14 in a clockwise direction so that it moves downwardly toward the left, as viewed in FIG. 14, thus releasing the shank with the button sewn to the garment. The manner in which the shank is retained in position over the garment is clearly apparent from FIG. 15.

The embodiment of FIG. 16 is identical with that of FIGS. 10–14 except that the feed bar 220 has at its right end as viewed in FIG. 16, a configuration conforming to the left half of each shank 200 which is in a position to be displaced to the positioning means 222 which corresponds to the positioning means 216 of FIG. 4. Thus, the feed bar 220 has at its right end an edge 226 as illustrated in FIG. 16 for engaging a shank 200 without tilting the latter and displacing the shank as shown in dot-dash lines in FIG. 16 to the position shown at the right of FIG. 16. In this position the part 222 has a configuration according to which it extends along the right part of the shank, thus securely maintaining the latter in the position shown in dot-dash lines at the right of FIG. 16 to be sewn between a button and a garment as described above.

It is apparent from the above description that with the structure of the invention the operator need not perform careful time-consuming manipulations involved in connection with handling of the shanks. They are automatically delivered to the feed means which serves to automatically transport them to the positioning means which with the feed means serves to maintain the shank properly in position for the button-sewing operations to be carried out.

After the sewing operations are completed the bar 68 is again retracted slightly so that the garment with the button sewn thereon and the shank between the button and the garment can be displaced and a new button-sewing operation can go forward as described above.

What is claimed is:

1. For use with a button-sewing attachment, positioning means for positioning a shank which has a predetermined peripheral configuration at a predetermined location with respect to a button, feed means coacting with said positioning means for feeding a shank thereto to be positioned thereby and said feed means also coacting with said positioning means for retaining a shank in a location positioned by said positioning means, and guide means coacting with said feed means for guiding shanks successively thereto to be individually fed thereby to said positioning means, said positioning means forming part of a support means which supports said feed means for movement between a retracted position where said feed means receives a shank from said guide means and a retaining position where said feed means retains a shank at a location determined by said positioning means, said support means being in the form of a plate having at one end region a portion formed with an edge defining a recess of a configuration conforming to part of the peripheral configuration of said shank for extending partly around a shank to determine the position thereof, said feed means being in the form of an elongated feed bar shiftable on said plate between said retracted and retaining positions, and said feed bar terminating in an end edge defining a recess conforming to another part of the peripheral configuration of said shank for extending around another part of the shank to coact with said edge of said plate to retain the shank in the position determined by said positioning means.

2. The combination of claim 1 and wherein said positioning means and said feed means when retaining a shank at a location determined by said positioning means extend around the shank with a clearance sufficient to free the shank for rotary movement.

3. The combination of claim 1 and wherein an elevation adjusting means coacts with said positioning means for adjusting the latter in elevation to determine the elevation of a shank with respect to a button.

4. The combination of claim 1 wherein said edges are arcuate parts of a circle and are adapted to extend around a circular shank with a clearance sufficient to permit free rotary movement of a shank.

5. The combination of a claim 1 and wherein said guide means includes an elongated guide channel having a discharge end closed by said feed bar except when the latter is in its retracted position, said feed bar extending across said channel for feeding the shanks one by one from said channel to said positioning means.

6. The combination of claim 5 and wherein a supply hopper means coacts with said channel for delivering shanks thereto.

7. The combination of claim 5 and wherein said channel and support means are fixed to each other to form a unitary body, and a plurality of adjusting means operatively connected with said body for adjusting the latter with respect to a button-sewing attachment, said plurality of adjusting means including one adjusting means for adjusting the body longitudinally with respect to a button-sewing attachment, a second adjusting means for adjusting the body transversely with respect to the button-sewing attachment, and a third adjusting means for adjusting the body in elevation with respect to the button-sewing attachment.

8. The combination of claim 1 and wherein a handle is fixed to and extends from said feed means for operating the latter manually.

9. The combination of claim 1 and wherein a spring means is operatively connected with said feed means for yieldably urging the latter to a position retaining a shank at a position determined by said positioning means.

10. The combination of claim 7 and wherein at least one of said adjusting means coacts with the button-sewing attachment for fixing the shank supply attachment thereto.

11. The combination of claim 1 and wherein said edge at said one end region of said portion of said plate of said support means has a curvature conforming to part of a circle corresponding to the configuration of an end of an elongated shank for extending partly around a shank at one end thereof to determine the position thereof, said feed means having at said end edge of said feed bar a configuration which in part is semicircular for engaging an end of a shank opposed to that end which is engaged by said edge at said end region of said plate of said support means.

12. The combination of claim 11 and wherein said support means has a shoulder engaging a leading end of each shank as it is guided by said guide means to said feed means, said feed bar of said feed means having beyond said semicircular part of said end edge thereof an extension for tilting each shank with a feed bar and to displace a free end of each shank into engagement with said curved edge at said end region of said plate of said support means.

13. The combination of claim 1 and wherein said feed bar terminates in an end edge having substantially the configuration of a longitudinal half of an ellipse for engaging one side of an elongated shank of substantially elliptical configuration to displace the latter to said positioning means, said support means having at said portion at said one end region an edge of a configuration corresponding to part of the remaining half of the shank of elongated substantially elliptical configuration for coating therewith to position the latter shank.

* * * * *